Figure 1:
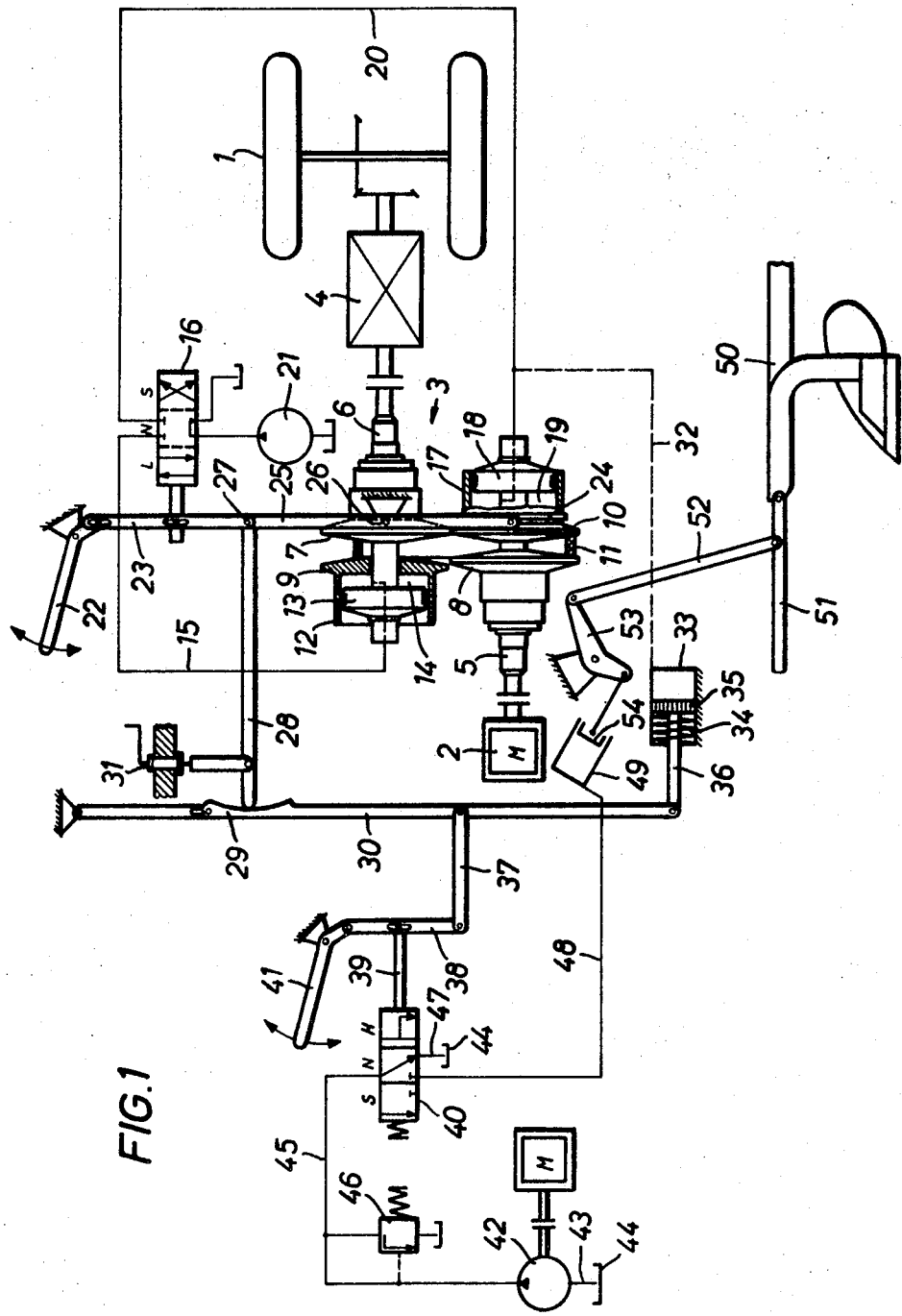

United States Patent [19]

Koenig et al.

[11] 3,716,104
[45] Feb. 13, 1973

[54] CONTROL DEVICE FOR THE POWER LIFTING INSTALLATION OF A TRACTOR

[75] Inventors: Walter Koenig, Bergisch Gladbach; Heribert Adams, Rosrath near Cologne; Franz Heidjann, Oelinghausen, all of Germany

[73] Assignee: Klockver-Humboldt-Deutz Aktiengesellschaft, Koln-Deutz, Germany

[22] Filed: Dec. 8, 1969

[21] Appl. No.: 883,164

[30] Foreign Application Priority Data

Dec. 7, 1968 Germany.................P 18 13 401.5

[52] U.S. Cl............................................172/7, 172/8
[51] Int. Cl..........................................A01b 63/112
[58] Field of Search...................................172/2–8; 74/230.17; 74/388

[56] References Cited

UNITED STATES PATENTS 2,629,306 2/1953 Rusconi....................................172/2
2,731,849 1/1956 Rockwood et al..........74/230.17 FT
3,251,422 5/1966 Allgaier et al............................172/4

FOREIGN PATENTS OR APPLICATIONS 1,195,997 9/1964 Germany..................................172/3
1,132,475 11/1968 Great Britain...........................172/7
1,182,973 3/1970 Great Britain...........................172/7

Primary Examiner—Robert E. Pulfrey
Assistant Examiner—R. T. Rader
Attorney—Walter Becker

[57] ABSTRACT

A tractor with a power operated implement lift and a hydraulically adjustable speed transmission. The driving speed of the tractor is detected and the load torque on the tractor is detected and the detected driving speed and torque values are compared and produce a control movement when there is a decrease of speed of the tractor due to an increase of load torque on the tractor or vice versa. The control movement operates to cause the power operated lift to adjust the elevation of an implement connected thereto when there is a change in either the speed of the tractor or the load torque thereon without a change in the other in the same sense.

7 Claims, 3 Drawing Figures

CONTROL DEVICE FOR THE POWER LIFTING INSTALLATION OF A TRACTOR

The present invention relates to a control device for the power lifting installation of a tractor, which comprises means for continuously ascertaining the actual values of its driving torque employed for the control of a power lifting installation or a ground working implement pulled by the tractor.

Control devices of this type have become known, for instance, from German Pat. No. 1,099,775, according to which for continuously ascertaining the actual values of the driving torque, mechanical or hydraulic devices are employed, The actual values are, in a manner known per se, conveyed to a control valve of the power lifting installation or power lifting plant, which in its turn, controls the supply of pressure fluid to the lifting cylinder for the power lifting means. It is, however, a well known fact that the forces effective on the tool of the soil working implement depend on the working speed of the tractor. With a power lifting plant controlled in conformity with the driving torque, there exists the drawback that for instance when working a hilly area with the same soil conditions, but at different working speed, the working depth changes. The same situation occurs when on a plane or hilly terrain after a reversing operation of the tractor with soil working implement, the tractor is accelerated or retarded.

It has furthermore become known from the German Pat. No. 1,195,887, to provide a control device for the power lifting plant of a tractor, in which the actual values are ascertained in conformity with the encountered working resistance and the driving speed and are brought into relationship to each other while the resulting comparison value serves for controlling the power lifter. For purposes of ascertaining the working resistance, in most instances awkward linkage systems are necessary for transferring the actual values from one measuring spring to the comparing device and from the soil working implement to the measuring spring. Such linkage systems, in particular the linkage system between the working implement and the measuring spring have a play at their joints so that measuring inaccuracies are obtained. There is furthermore the drawback to be added that with each movement of the linkage system a considerable moment of inertia has to be overcome.

It is also known with a tractor that the driving torque is substantially proportional to the working resistance of an attached soil working implement.

Based on this finding, it is an object of the present invention for a tractor to provide an as simple a device as possible for controlling the power lifter plant, according to which the drawbacks of a power lifting plant will be safely avoided which is controlled in conformity with the encountered working resistance and the driving speed.

These objects and other objects and advantages of the invention will appear more clearly from the following specification, in connection with the accompanying drawings, in which:

FIG. 1 diagrammatically illustrates a control device according to the invention with a tractor having a chain or V-belt converter which is adjustable by a pressure medium.

Figure 2:
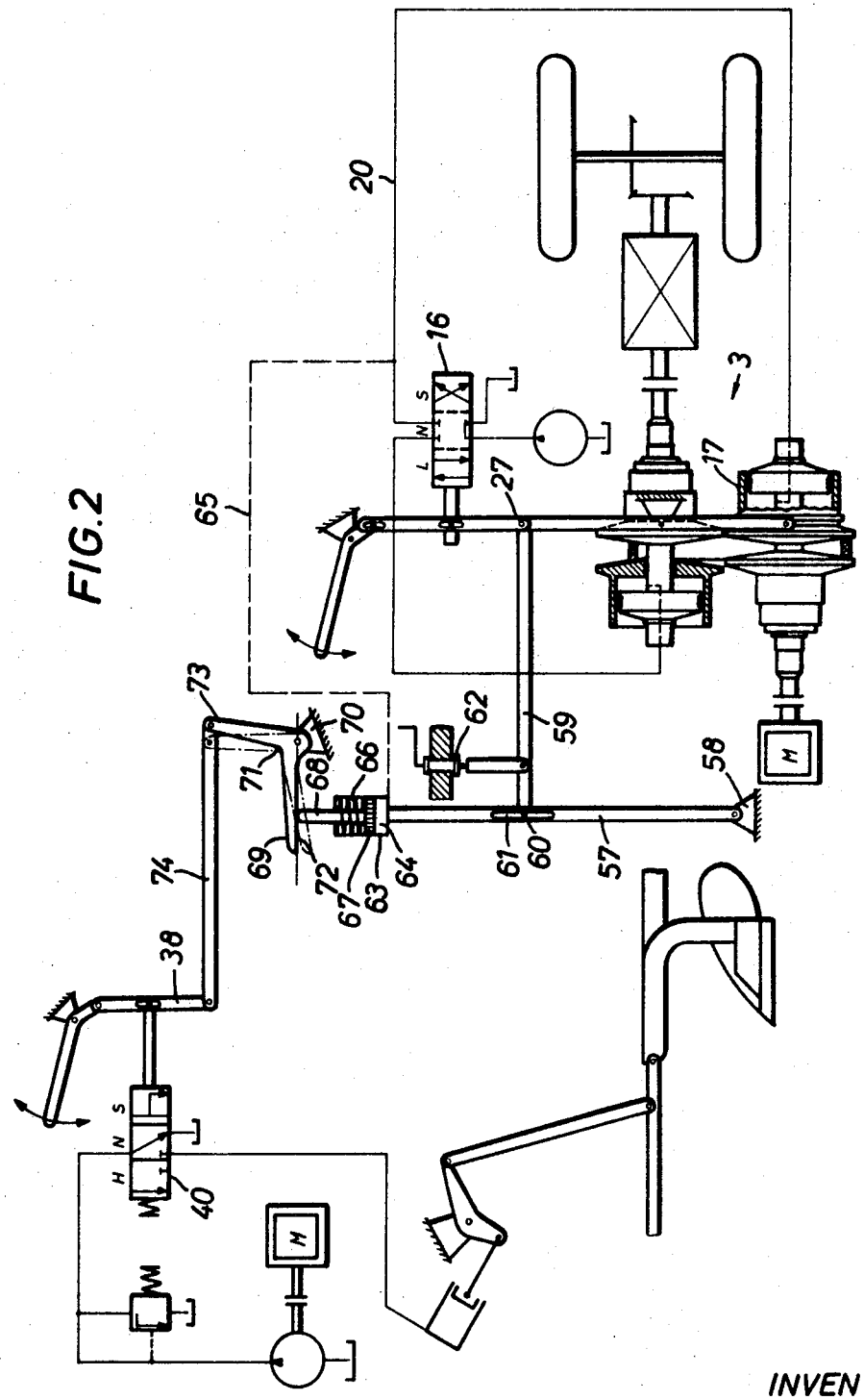

FIG. 2 diagrammatically illustrates a modification over FIG. 1 from which it differs with regard to the comparison device for the actual values of the driving torque and driving speed.

Figure 3:
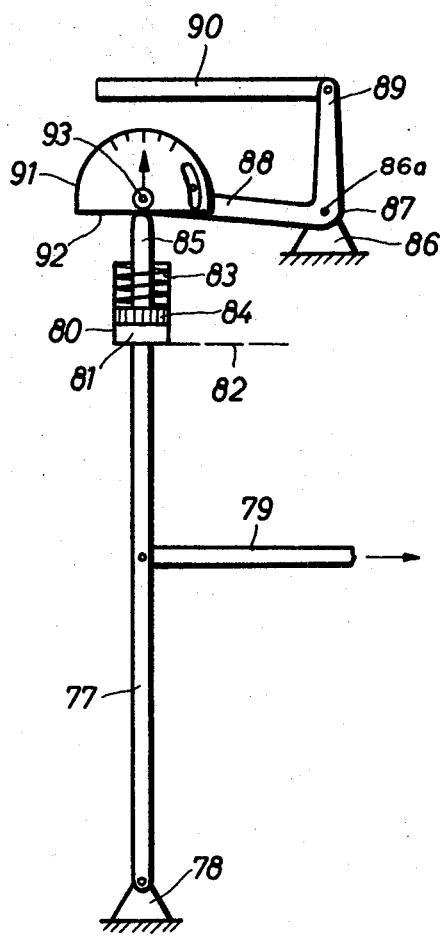

FIG. 3 represents a comparison device for use in connection with an arrangement of FIG. 2, with an adjustable intermediate member which is additionally arranged on an angle lever.

The problem underlying the present invention has been solved by equipping the tractor in a manner known per se with a device for ascertaining the actual values in conformity with the driving speed, and further by providing a comparison device in which the actual values of the driving torque and the actual values of the driving speed are brought into mutual relationship while the comparison value serves for controlling the power lifter plant. Such an arrangement has particular advantages with a tractor equipped with a hydrostatic drive, inasmuch as the pressure prevailing in the pressure line between the pump and the hydromotor is at a certain ratio to the respective driving torque. As measuring device in this instance will suffice a cylinder piston system connected to the pressure line, in which the piston acts upon the comparing device.

With a control device having a scale beam-like addition lever as comparing device which lever within the range of its extension communicates with the control spool of the hydraulic system and at one end communicates with the device for ascertaining the actual values of the driving speed, it is provided that the other end of the addition lever is connected to the device for ascertaining the actual values of the driving torque.

With a tractor equipped with an infinitely variable torque converter, especially with a pressure fluid adjustable chain or V-belt converter whose pressure is automatically controlled by the respective transmitted torque, it is advantageous preferably to connect that adjusting cylinder of the chain or V-belt converter which faces the driving side, with a cylinder whose spring loaded piston acts upon the addition lever.

If the comparing device includes an addition lever having one end stationarily arranged while said addition lever within the area of its extension communicates with the supply for the actual values of the driving speed and while as measuring device for the actual values of the driving torque there is provided a cylinder with a spring loaded piston, the cylinder may be connected to the free end of the addition lever. The spring loaded piston or its piston rod slidably engages one leg of a pivotally arranged angle lever which latter together with the addition lever is located in a common tilting plane while the other leg of the angle lever is connected to the control spool for the hydraulic system. In this connection it may be advantageous if between the piston rod of the spring loaded piston and the leg of the angle lever there is provided an intermediate member which is adjustable arranged on said angle lever and comprises the sliding surface for the piston or the piston rod so that by adjusting the said intermediate member the angular position of the gliding surface can selectively be varied with regard to the piston or the piston rod.

Referring now to the drawings in detail, the arrangement shown therein comprises a tractor which is illustrated only by showing its rear wheels 1 and its motor 2 which latter through an infinitely variable torque converter 3 and a subsequent intermediate transmission drives the said rear wheels 1. The infinitely variable torque converter is formed by a hydraulic operable chain or V-belt converter which comprises two transmission shafts 5 and 6. The transmission shaft 5 represents the driving shaft and is drivingly connected to the motor 2, whereas the transmission shaft 6 serves as output shaft and is drivingly connected to the intermediate transmission 4. Respectively mounted on the two transmission shafts 5 and 6 are nondisplaceable conical discs 7,8 and axially displaceable conical discs 9 and 10. Between said discs there is provided a pulling means 11 for transmitting power from the driving shaft 5 to the output shaft 6. The conical disc 9 is equipped with an annular cylinder 12 for adjustment of said disc 9. Said cylinder 12 has arranged therein a piston 13 which is connected to the output shaft 6. A working chamber 14 provided between the piston 13 and the cylinder 12 communicates through a conduit 15 with a valve 16. Similarly, the conical disc 10 is provided with an annular cylinder 17 for adjustment of disc 10. In the cylinder 17 there is provided a piston 18 connected to the input or driving shaft 5. A working chamber 19 which is provided by a piston 18 within the cylinder 17 communicates through a line 20 with the valve 16 which, in its turn, communicates with a pressure fluid pump 21. Slide 16 serves for selecting the transmission ratio of the torque converter 3 and therefore has three positions, namely, slow, neutral and fast which can be set by means of manual lever 22 and by means of an intermediate lever 23 engaging the spool of the valve 16. In conformity with the adjustment of the valve 16, a change in the distance between the conical discs 7 and 9 and an opposite change in the distance between the conical discs 8 and 10 is effected. In this way, the torque converter 3 can be set for different transmissions. For producing the pressing forces required for the frictional transfer of forces, there are provided mechanical pressing devices known per se, which are not shown in the drawing. These pressing forces press the movable conical discs in conformity with the respective driving torque to be transferred against the pulling member 11 which preferably is formed by a chain. The cylinder 17 which is provided on the conical disc 10 has an annular groove 24 in which is guided one end of a lever 25. This lever is preferably guided by means of a nonillustrated block or groove engaging member. The lever 25 is pivotally mounted for pivoting approximately centrally about a stationary point 26 and has its other end in engagement with the intermediate lever 23 through a joint connection 27. The joint connection 27 is in addition to being engaged by the levers 23 and 25 also engaged by one end of a third lever, the other end of which is slidably guided in a cam member 29 which is located at the upper end of a scale beam-like addition lever 30. The lever 28 is intended to convey the actual values of the driving speed from the conical disc 10 which serves as emitter and is adjusted proportionally to the driving speed, to the addition lever 30. By means of an adjusting device 31, that end of lever 28 which is slidable on the cam member 29 can be adjusted as to its location with regard to the cam member so that the magnitude of the influence of the driving speed upon the addition lever 30 can be changed selectively.

The conduit 20 communicates through a control line 32 with a cylinder 33 the piston 35 of which rests against a pressure spring 34 and by means of a piston rod 36 engages that end of the addition lever 30 which faces away from the cam member 29. Linked approximately centrally to the addition lever 30 is a transfer lever 37 which in its turn through a control lever 38 and a pushrod 39 is connected to the valve spool 40 of a hydraulic power lifting device. A manual lever 41 is connected to the control lever 38 and permits the selection of a rated value from the values conveyed from the addition lever 30 to the control lever 38.

The hydraulic power lifting device, in addition to comprising a valve spool 40, also has a pressure fluid pump 42 which through a suction line 43 communicates with a pressure fluid reservoir 44 and through a line 45 communicates with the valve spool 40. For purposes of protecting the hydraulic power lifting device against overload, the conduit 45 is equipped with a relief valve 46. From the control valve or valve spool 40, a return line 47 leads to the reservoir 44. Furthermore, the valve spool 40 is through a line 48 in communication with a cylinder 49 which serves as lifting cylinder for the power lifter. A soil working implement in the form of a plough 50 is provided on the tractor which implement is, in a manner known per se, through lower link means 51 and lifter rods 52 connected to the lifter arms 53. A piston 54 guided in the lifting cylinder 49 engages the lifter arms 53.

The operation of the described device is as follows: When the torque converter 3 has its output shaft 6 under the load of a torque, it will try to adjust itself so as to reduce its speed. The conical disc 10 will on the output side of the torque converter move toward the right. This movement of the conical disc 10 is by the lever 25 and the lever 23 linked thereto conveyed to the control valve 16 in such a way that the control valve or control spool 16 moves from the illustrated neutral position toward the left. The valve spool 16 has a very steep characteristic so that already by means of a very slight axial displacement of the conical disc 10 it can bring about a considerable pressure increase in conduit 20. In view of the displacement of the valve spool 16 toward the left, a high pressure rise occurs in conduit 20 and in cylinder 17, while the cross-section of line 15 is increased by valve spool 16 toward the return line. In view of the pressure increase in cylinder 17, a supporting force builds up which acts counter to the axial displacement of the conical disc toward the right so that the preselected transmission ratio of the torque converter as set by the lever 22 remains unchanged. Thus, at the conical disc 10 a supporting force is built up which in conformity with the respective load of the torque converter will just suffice to prevent a change in the transmission ratio of the torque converter. The magnitude of the pressure in the cylinder 17 and in the conduit 20 thus corresponds to the respective driving torque to be transmitted by the torque converter. The pressure in conduit 20 is through control line 32 conveyed to the cylinder 33 or its piston 35 which latter in its turn brings about a corresponding adjustment of the addition lever 30. In this connection it may be mentioned that the respective driving torque to be conveyed by the torque converter 3 is proportionally dependent on the working resistance encountered by the plough 50.

As already mentioned, the lever 28 conveys the actual values of the driving speed of the tractor to the addition lever 30. The actual values of the driving torque and the actual values of the driving speed are correlated and the comparison value resulting therefrom is by the transfer lever 37 conveyed to the adjusting lever 38 and from the latter through pushrod 39 to the control valve 40. FIG. 1 shows the control valve 40 in its neutral position in which the pressure medium delivered by the pump 42 flows through line 45, control valve 40 and line 47 back to the reservoir 44. If now a lifting impulse is emitted by the addition lever 30, the control valve 40 is displaced to its left-hand end position so that the conduits 45 and 48 are connected to each other and that the pressure medium flows from the pump 42 into the pressure cylinder 49. As a result thereof, the piston 54 brings about a pivoting movement of the lifter arms 53 of the power lifter in clockwise direction and thereby lifts the plough 50. If on the other hand the control valve 40 receives from the addition lever 30 a lowering impulse, the control slide is displaced to its right-hand position. In this position, on one hand, the pressure medium circulates without pressure through conduits 45 and 47, and on the other hand the pressure cylinder 49 is through conduits 48, 47 connected to the reservoir 44 so that the piston 54 permits a pivoting of the arms 53 in clockwise direction and thereby a lowering of the plough 50.

FIG. 2 shows a modification in which on the right-hand side of the drawing there are shown the rear wheels 1 of a tractor not further illustrated. The said tractor is driven by the same elements as those described in connection with FIG. 1. Therefore, those elements of FIG. 2 which correspond to the same elements of FIG. 1 have been designated with the same reference numerals. The arrangement of FIG. 2 differs from that of FIG. 1 primarily in that in FIG. 2 there is provided an addition lever 57 which has its lower end pivotally arranged on a stationary support 58. The lever 59 serves for transferring the actual values of the driving speed from the linkage point 27 to the addition lever 57. Lever 59 by means of a bolt 60 engages an oblong hole 61 of the addition lever 57. The magnitude of the influence of the driving speed upon the addition lever 57 may be preselected by means of an adjusting device 62 engaging the lever 59.

At the upper end of the addition lever 57 there is arranged a cylinder 63 which is fixedly connected to said lever 57 and the working chamber 64 of which communicates through a control line 65 with a conduit 20 which leads from the valve 16 to the annular cylinder 17. The cylinder 63 comprises a piston 67 resting against a pressure spring 66. The piston rod 68 pertaining to the piston 67 engages one leg 69 of an angle lever 71 which is pivotally supported by a support 70. The arrangement is such that the piston rod 68 in response to a pivoting movement of the addition lever 57 is while engaging leg 69 displaceable on a sliding surface 72 extending in the longitudinal direction of the leg 69. The other leg 73 of the angle lever 71 is engaged by one end of a transfer lever 74 the other end of which is pivotally connected to the adjusting lever 38. The structure and operation of the hydraulic device of the power lifting device correspond to those described in connection with FIG. 1.

The addition lever 57 is adapted during the operation of the device to be pivoted by lever 59 in conformity with the respective driving speed of the tractor in which instance the piston rod 68 slides on the sliding surface 72 of the angle lever 71 and pivots the same to a corresponding position. Simultaneously therewith, the pressure in the working chamber 64 of the cylinder 63 is determined in conformity with the respectively prevailing driving torque so that the piston 67 or piston rod 68 is moved in one or the other direction. As a result thereof, the addition lever 57 is, depending on the direction of movement of the piston rod 68, so to speak extended or reduced in length. The sliding and axial movements of the piston rod 68 will on angle lever 61 from the actual values of the driving speed and the driving torque compute a comparison value which is continuously, for purposes of controlling the power lifter device, transferred from the angle lever 71 to the transfer lever 74 and from the latter through the intermediate lever 38 to the control valve 40.

FIG. 3 similar to FIG. 2 shows an addition lever 77 which is pivotally supported by a stationary support 78. For purposes of transferring the actual values of the driving speed from a non-illustrated torque converter of the described type there is provided a lever 79 which is approximately centrally pivotally connected to the addition lever 77. Arranged at the upper end of the addition lever 77 is a cylinder 80 which is fixedly connected thereto and the cylinder chamber 81 of which communicates through a control line 82 with a conduit which supplies pressure fluid to the driving disc set of the non-illustrated torque converter. The cylinder 80 houses a piston 84 which rests against a pressure spring 83, said piston 84 being provided with a piston rod 85. Above the addition lever 77 there is arranged an angle lever 87 which is pivotable about a pivot 86a supported by a support 86. The leg 89 of the angle lever 87 is pivotally connected to a transfer lever 90 which similar to FIG. 2 is connected to the likewise non-illustrated control valve of the hydraulic device of the power lifter. The leg 88 has its free end provided with a semicircular intermediate member 91 which has that side thereof which faces toward the lever 77 provided with a plane sliding surface 92. The arrangement of lever 77 relative to the lever 87 is such that the piston rod 85 continuously engages the sliding surface 92 of the intermediate member 91 and in response to pivoting movements of the lever 77 is adapted to slide on the sliding surface 92 in the longitudinal direction of the leg 88. The intermediate member 91 is on the leg 88 of lever 87 pivotable about a bolt 93 and is adapted to be arrested in its respective position. In view of the pivoting of the intermediate member 91 about the bolt 93, the angle position of the sliding surface 92 with regard to the piston rod 85 can selectively be varied so that depending on the setting, the inflow magnitude of the actual values of the driving torque or of the driving speed will prevail.

In order to permit an adjustment of the intermediate member 91 in a simple manner also during operation, a self-locking control drive connected to the intermediate member 91 may be provided the drive shaft of which is, for instance, coaxially arranged with regard to the pivot axis of the angle lever 87.

It is, of course, to be understood that the present invention is, by no means, limited to the particular showing in the drawings but also comprises any modifications within the scope of the appended claims

What is claimed is:

1. In a control arrangement for the power operated implement lift of a tractor having a stepless variable speed transmission with cooperating drive members which include means that tend to move relatively toward decreased drive ratio position when the load on the transmission increases; first control means movable in a first direction to cause the lift to lower an implement connected thereto into working position and in a second direction to cause the lift to raise the implement to idle position, movable second control means operatively connected to said drive members and adjustable to select a driving ratio for said transmission, means responsive to movement of said drive members as to driving speed brought about by an increase in load on the tractor for proportionately moving said second control means, movable third control means responsive to drive torque with respect to operational resistance of the load on said tractor and movable in response to increases in said load, a comparing device in which drive torque and driving speed are taken and the comparison value serves for controlling the power operated implement lift, first means operatively connecting said comparing device to said first control means, second means operatively connecting said comparing device to said second control means, and third means connecting said third control means to said comparing device, each of said second and third control means when moved making said comparing device effective to move said first control means to cause the lift to raise the implement to idle position thereof.

2. A control arrangement according to claim 1, in which said comparing device is a scale-beam addition lever, said second control means including a control valve, hydraulic means pertaining to said drive members and having the supply of fluid thereto under the control of said valve, means effective upon movement of said second control means due to an increase in load on said tractor moving said valve to increase the hydraulic pressure supplied to one of said drive members, said third control means comprising a spring-loaded piston urged in the said one direction of movement thereof by the said hydraulic pressure supplied to said one drive member and spring urged in the other direction.

3. A control arrangement according to claim 2, in which transmission is infinitely adjustable and has adjustable input and output pulley means and a flexible drive element entrained about said pulley means, each pulley having a respective fluid actuated adjusting means connected to said valve, the said fluid actuated adjusting means pertaining to said input pulley means being hydraulically connected to said piston of said third control means that engages said addition lever.

4. A control arrangement according to claim 3, which includes means for automatically effectively adjusting the point along said addition lever where said second control means acts on said addition lever.

5. A control arrangement according to claim 4, in which said comparing device lever is pivotally supported at one end, said second control means acting on said lever between the ends thereof, said third means comprising a pivotally supported two arm lever means having one arm connected to said first control means and a second arm adjacent the other end of said comparing device lever, said lever having a cylinder on said other end, said piston being mounted in said cylinder and being reciprocable therein axially of said comparing device lever and engaging said second arm of said two arm lever means.

6. A control arrangement according to claim 5, which includes a semi-circular intermediate member mounted on said second arm of said two arm lever means and presenting a plane sliding surface to said piston, said intermediate member being adjustable relative to said second arm to vary the angle of said sliding surface to the direction of the length of said comparing device lever.

7. A control arrangement according to claim 1, which includes manual operating means for actuating said first control means.

* * * * *